Sept. 10, 1929.  Q. C. A. CRAUFURD ET AL  1,727,536
WIRELESS SIGNALING SYSTEM
Filed Oct. 31, 1928

INVENTORS
Q. C. A. CRAUFURD
C. C. J. FROST

Patented Sept. 10, 1929.

1,727,536

UNITED STATES PATENT OFFICE.

QUENTIN CHARLES ALEXANDER CRAUFURD, OF LYDD, AND CYRIL CHARLES JAMES FROST, OF WINDSOR, ENGLAND.

WIRELESS SIGNALING SYSTEM.

Application filed October 31, 1928, Serial No. 316,300, and in Great Britain August 12, 1927.

This invention relates to wireless signaling systems and has for its object to provide a new or improved method of and means for transmitting and receiving electric radiations which are propagated through a conductive medium such as earth or sea. The invention may also be applied to wireless signaling apparatus disposed on or within a conducting body such as the hull of an airship, which may be surrounded by a dielectric medium.

According to the invention, wireless signaling apparatus is provided wherein electric oscillations or stationary electric waves are set up in a system of conductors which is electrostatically coupled to the earth or other conductive medium, such as the hull of a ship, but which has a low radiation resistance as regards the dielectric medium so that it is not appreciably affected under working conditions by Hertzian waves.

The invention, therefore, provides a means of utilizing the hysteresis in the said dielectric medium between earth and the said system of conductors which includes an inductance connected to earth or other conductive medium and one or more conductors possessing capacity relatively to earth and so acting as an equivalent condenser, and this utilization is effected by matching the lag due to polarization of the dielectric with the lag due to inertia of the inductance which, when charged by currents, creates a weak magnetic field around one armature of the aforesaid capacity-possessing conductor or conductors forming the equivalent condenser.

This interaction of the two lags introduces such a time constant into the capacity of the equivalent condenser as to change that capacity relatively to the phase of the charging currents, the rate of change determining the position of a nodal or reflecting point for stationary waves while the magnetic field is being built up in one armature of the condenser and the dielectric is being polarized under the electric field.

In known systems of tuning, the inductance and capacity of the circuit are separate so that the E. M. F. may be brought into phase with the current or vice versa, but according to this invention, the inductance and capacity are so closely associated at one point where the magnetic and electric fields are out of phase that a nodal point is produced according to each frequency.

Known systems of reception without using an elevated, or a frame, aerial have relied on buried antennæ, charged plates, or a plurality of condensers or of earth connections, or on the maintenance of electrical oscillations in the dielectric while receiving the incoming waves, but in the present invention one earth connection only is employed and the equivalent of one condenser in series with the oscillating circuit and it is not necessary to maintain oscillations in the dielectric and therefore the invention can be used in conjunction with a crystal detector.

The present invention is therefore an earth wave system wherein nodal points are formed relatively to the stationary waves set up in the earth or other conductive medium. The invention can also be used with advantage in an aerial circuit to sharpen the tuning by dividing the circuit into portions analogous to the fretting on a stringed instrument where the natural period of the string is altered by stopping and so creating nodal points where required.

In order that the invention may be more readily understood, reference will be made to the accompanying drawings in which.

Figure 1:
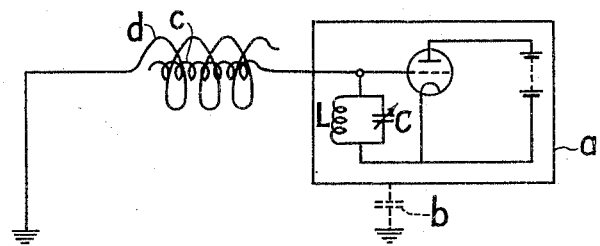
Fig. 1 is a diagrammatic view of a radio signaling system embodying the novel features of the invention.

In the arrangement shown in Figure 1, a conventional receiving set, having a tuned oscillatory circuit L. C. coupled to a valve detector, is enclosed in an insulated electrostatic screen $a$ which has a natural capacity to earth represented by the imaginary condenser shown in dotted lines at $b$.

The grid pole of the oscillatory circuit L. C. is connected to an oscillatory system which is electrostatically coupled to earth but which has a low radiation resistance so that it is not appreciably affected by Hertzian waves.

As indicated in the said Figure 1, the oscillatory system takes the form of two open coils $c$, $d$ of insulated wire, wound one on the other, and connected one to earth and one to the grid pole of the oscillatory circuit L. C. as shown. For the purpose of reducing the mutual inductance as much as possible, the coils $c$ and $d$ are wound so that their turns cross one another at right angles.

The oscillatory system composed of the elements $c$, $d$ will accept any frequencies within limits. It has a low radiation resistance such that it is not appreciably affected by Hertzian waves. Owing to the electrostatic coupling to earth however, the effect of electric oscillations transmitted through the earth will be to set up electric oscillations or stationary waves in the system $c$, $d$. The oscillation circuit L. C. is tuned to the frequency of the waves to be received and acts as a rejector for the selected frequency. When the circuit L. C. is correctly tuned, the acceptor composed of the elements $c$, $d$ will apply magnified potential oscillations to the grid pole of the circuit L. C.

It will be seen that the acceptor could take many different forms.

Figure 2:
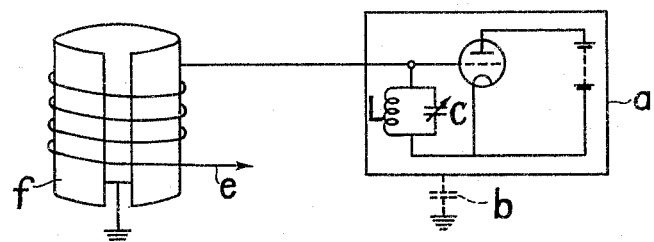
Fig. 2 is a view similar to Fig. 1 illustrating an alternative embodiment of the invention.

For example, as shown in Figure 2, an open coil $e$ of insulated wire connected at one end to the grid pole of the oscillatory circuit L. C. is wound on an earthed metal cylinder $f$.

Figure 3:
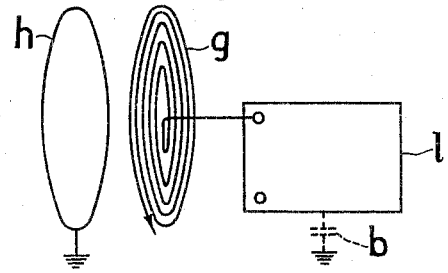
Fig. 3 is a view similar to Figs. 1 and 2 illustrating another alternative embodiment of the invention.

Figure 3 shows an arrangement in which a flat spiral $g$ of insulated wire is disposed adjacent an earthed metal disc $h$.

Figure 4:
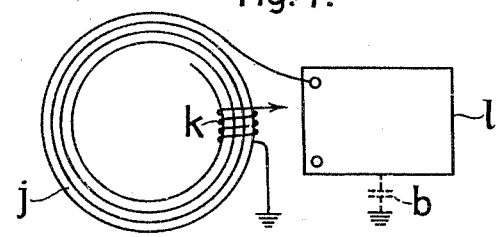
Fig. 4 is a view similar to Figs. 1 to 3 illustrating a further alternative embodiment of the invention.

In Figures 3 and 4, the screen $a$ is dispensed with and the coil $g$ or $j$ is connected to the aerial terminal of an ordinary receiving set 1. This set, together with the batteries, telephones and other devices associated therewith, is insulated from earth, but the filament supply leads and other conductors connected to the "earth" terminal of the set have a natural capacity to earth which is represented in the drawings by the imaginary condenser $b$.

In each of the arrangements shown in Figures 1-4, the screen $a$ or the earth terminal of the receiving set (i. e. that pole of the circuit L. C. which is connected to the valve filament) may be connected to earth either directly or through a condenser. In most cases, however, the natural capacitive coupling represented by the imaginary condenser $b$ is sufficient.

The oscillations induced in the system, $c$, $d$, $e$, $f$, $g$, $h$ or $j$, $k$ may be due in some measure to the fact that the system is electrostatically coupled to the earth at spaced points, i. e. at the capacity between the elements of the oscillatory system and at the capacity between the receiving set or the screen $a$ and the earth. The major effect, however, is probably due to the production of stationary electric waves in the conductors $c$, $d$, $e$, $f$, $g$, $h$, or $j$, $k$; there being a potential loop at the grid pole of the oscillatory system L. C.

Figure 5:
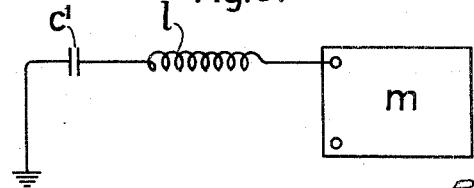
Fig. 5 is a view similar to Figs. 1 to 4 illustrating still another alternative embodiment of the invention.

In the arrangement shown in Figure 5, $m$ represents a conventional receiving set having a tuned oscillatory circuit and one or more valves (not shown) the whole of this apparatus (including batteries and telephone) being preferably insulated from the earth. The "aerial" terminal of the tuned oscillatory circuit is connected through an inductance $l$ in series with a condenser $c^1$ to earth. When this system comes under the influence of electric oscillations transmitted through the earth, oscillations are set up in the system $l$. $c^1$ and affect the "aerial" terminal of the receiver.

Although the arrangements shown diagrammatically in the accompanying drawings are intended for use as receivers, it will be understood that the invention may be applied to transmitters by coupling any of the oscillatory systems described to a suitable generator of electric oscillations.

It will be understood that the arrangements described are independent of Hertzian waves transmitted from the radiating source through a dielectric medium, and can therefore be used underground, within the hulls of ships and in other places which are effectively screened as regards radiations which require a dielectric medium. Further, they could be used in the conducting hull of an airship, the oscillatory system being electrostatically coupled to the said conducting hull or to a conductor connected thereto.

We claim:—

1. In a radio signaling system, aperiodic collector means one end of which is free and the other end of which is connected to ground, a detector, and a coil in spaced relation to said aperiodic collector means connected with said detector, said aperiodic collector means comprising a coil the turns of which extend around the coil connected with the detector.

2. In a radio signaling system, aperiodic collector means one end of which is free and the other end of which is connected to ground, a detector, and a coil in spaced relation to said aperiodic collector means one end of which is free and the other end of which is connected with said detector, said aperiodic collector means comprising a coil the turns of which extend around the coil connected with the detector.

In testimony whereof we have affixed our signatures hereto this 19th day of October, 1928.

QUENTIN CHARLES ALEXANDER CRAUFURD.
CYRIL CHARLES JAMES FROST.